United States Patent
Ralston et al.

(10) Patent No.: US 10,097,664 B2
(45) Date of Patent: Oct. 9, 2018

(54) RECOMMENDING MEDIA ITEMS BASED ON PURCHASE HISTORY

(71) Applicant: Apple Inc., Cupertino, CA (US)

(72) Inventors: David E. Ralston, San Jose, CA (US); Daniel Joseph Sherman, San Francisco, CA (US); Christopher Laurence Bell, Pacifica, CA (US); Eswar Priyadarshan, Los Altos, CA (US); Andrew Williams, Mountain View, CA (US)

(73) Assignee: Apple Inc., Cupertino, CA (US)

(*) Notice: Subject to any disclaimer, the term of this patent is extended or adjusted under 35 U.S.C. 154(b) by 1278 days.

(21) Appl. No.: 13/871,573

(22) Filed: Apr. 26, 2013

(65) Prior Publication Data

US 2014/0324965 A1   Oct. 30, 2014

(51) Int. Cl.
*H04L 29/08* (2006.01)
*G06Q 30/02* (2012.01)
*G06Q 30/06* (2012.01)

(52) U.S. Cl.
CPC ....... *H04L 67/306* (2013.01); *G06Q 30/0255* (2013.01); *G06Q 30/0631* (2013.01)

(58) Field of Classification Search
CPC ............... G06Q 30/02; G06Q 30/0282; G06Q 30/0631; G06F 17/30867; G06F 17/30866
See application file for complete search history.

(56) References Cited

U.S. PATENT DOCUMENTS

| | | | |
|---|---|---|---|
| 8,005,724 B2 | 8/2011 | Dunning et al. | |
| 8,117,193 B2 | 2/2012 | Svendsen et al. | |
| 8,224,773 B2 | 7/2012 | Spiegel | |
| 8,341,158 B2 | 12/2012 | Acharya | |
| 2008/0040354 A1* | 2/2008 | Ray | G06F 17/30035 |
| 2008/0275904 A1* | 11/2008 | Breebaart | G06F 17/30743 |

(Continued)

FOREIGN PATENT DOCUMENTS

WO   2008/121872   10/2008

OTHER PUBLICATIONS

Wang, et al., Wang et al., "Music Recommender system for Wi-Fi Walkman," ICT Group Technical Report Series, No. ICT-2003-01, Delft University of Technology, Jan. 2003, pp. 1-23.

*Primary Examiner* — Azizul Q Choudhury

(74) *Attorney, Agent, or Firm* — Blank Rome LLP

(57) ABSTRACT

A media item recommendation can be based on application purchase data. Application purchase data of a population of users can be used to create application preference clusters that represent unique application preference profiles. Media preference data of the same population of users can be used to create media preference clusters that represent unique media preference profiles. A preference relationship between an application preference cluster and a media preference cluster can be identified based on the number of members of the media preference cluster that are also members of the application preference cluster. Upon receiving a recommendation request from a user, the user's application preference profile can be determined based on the user's application purchase data. A media item can then be recommended based on a media preference cluster that has a preference relationship with an application preference cluster that represents the application preference profile of the user.

23 Claims, 5 Drawing Sheets

(56) References Cited

U.S. PATENT DOCUMENTS

| | | | |
|---|---|---|---|
| 2010/0011020 A1 | 1/2010 | Bouzid et al. | |
| 2011/0320307 A1* | 12/2011 | Mehta | G06Q 30/0282 |
| | | | 705/26.7 |
| 2014/0067596 A1* | 3/2014 | McGovern | G06Q 30/02 |
| | | | 705/26.7 |

* cited by examiner

RECOMMENDING MEDIA ITEMS BASED ON PURCHASE HISTORY

TECHNICAL FIELD

The present technology pertains to recommending media items, and more specifically pertains to recommending media items based on a user's purchase history.

BACKGROUND

Traditional media stations, such as radio stations, have been providing media items to user for years. A user can select from a variety of available stations, each providing a certain type of media item. For example, when selecting a media station such as a radio station, a user can select from stations that play classic rock, modern rock, easy listening, hip-hop, R&B, etc. Although a user can select a media station based on their personal preferences, the media station is not customized to the specific user's preferences.

Online media stations can be customized based on a user's known media preferences. Some online media stations create a customized media station for a user based on media preference data provided by the user. For example, a user can select a seed media item upon which a customized media station can be created. Alternatively, a user can provide feedback such as indicating that the user likes or dislikes media items presented to the user as part of the media station.

While these methods can be effective, each requires that media preference data regarding the user be available to create the customized media station. This can be problematic in situations when the user does not wish to provide feedback or when media preference data for a user is unavailable. Accordingly, an improved method of recommending media items is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for recommending a media item to a user. To recommend a media item to a user when there is little or no media preference data available for the user, other available data regarding the user can be used. For example, in some embodiments, application purchase data identifying software applications purchased by the user can be used to recommend a media item to the user.

To accomplish this, application purchase data and media preference data gathered from a population of users can be used to create a set of application preference clusters and media preference clusters. In some embodiments, the application preference clusters and the media preference clusters can be created using a clustering algorithm such as a k-means algorithm.

Each resulting application preference cluster can represent a unique application preference profile based on the applications purchased by the members of the application purchase cluster. Likewise, each media preference cluster can represent a unique media preference profile based on the media preference data gathered from the members of the media preference cluster.

The resulting application preference clusters and media preference clusters can be analyzed to identify preference relationships between the application preference clusters and the media preference clusters. A preference relationship between an application preference cluster and a media preference cluster can indicate that a user that has the application preference profile represented by the application preference cluster likely also has the media preference profile represented by the media preference cluster. In other words, a user determined to have similar application preferences as members of the application preference cluster also likely has similar media preferences as members of the media preference cluster.

In some embodiments, identifying a preference relationship between an application preference cluster and media preference cluster can be based on whether members of the application preference cluster over-index in the media preference cluster. For example, an application preference cluster and a media preference cluster can be analyzed to identify the number of members of the media preference cluster that are also members of the application preference cluster. If it is determined that members of the application preference cluster over-index in the media preference cluster, a determination can be made that a preference relationship exists between the application preference cluster and the media preference cluster.

Upon receiving a recommendation request to recommend a media item for a user, the application preference profile of the user can be determined based on application purchase data gathered from the user. The preference relationships associated with the determined application preference profile of the user can be used to identify a media preference profile that the user likely has. A media item can then be chosen for the user based on the media preference data of the members of the media preference cluster that represents the identified media preference profile. For example, a media item that is commonly liked by members of the media preference cluster can be selected and then recommended to the requesting user.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
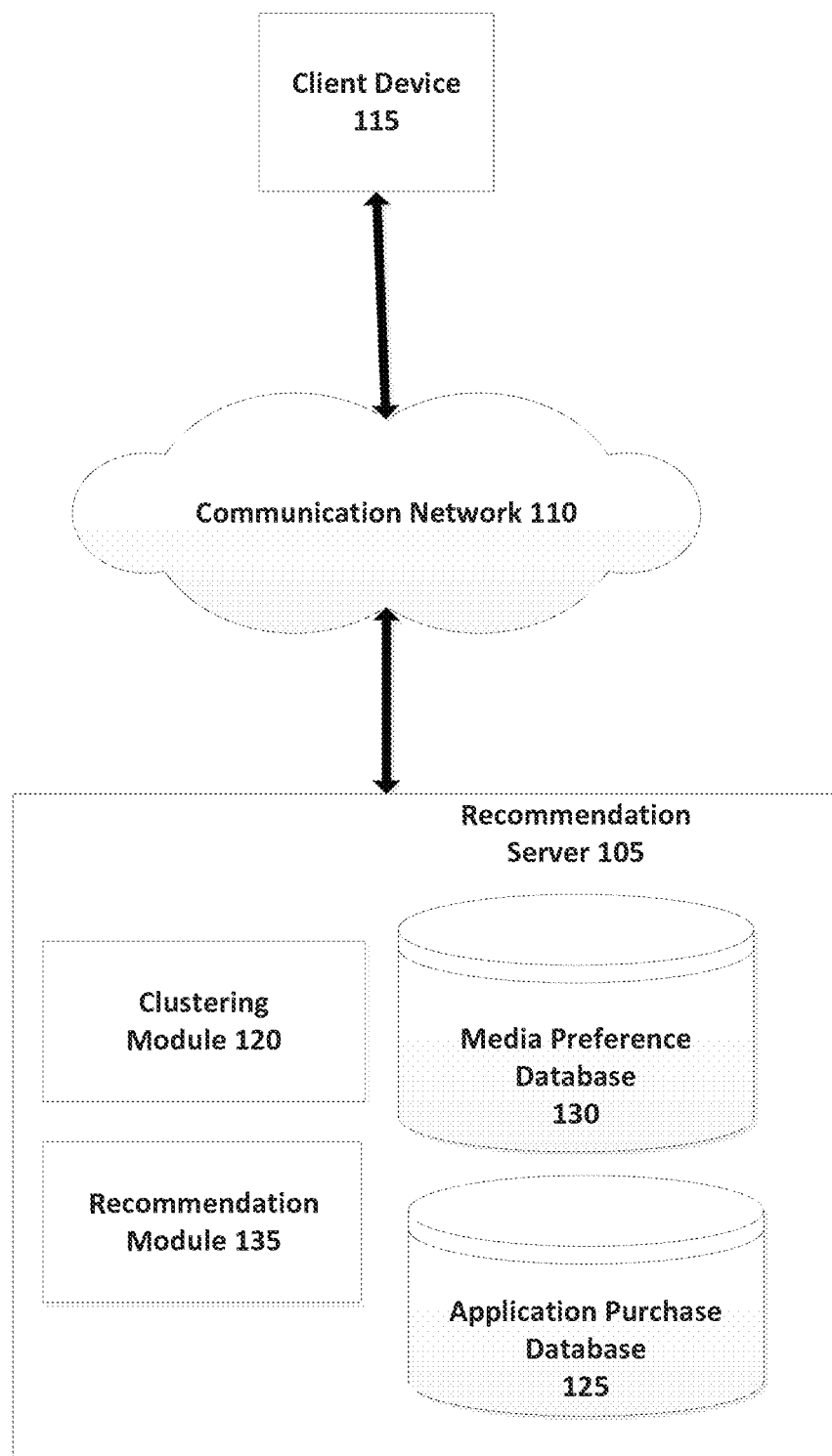
FIG. 1 illustrates a general purpose computing environment in which multiple computing devices can be configured to communicate with each other to recommend media items to a user.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for recommending media items to a user based on the user's purchase history. In some instances, there may be limited information available indicating a user's preferences regarding media items such as songs, movies, books, etc., however other data, such as the user's purchase history for unrelated items, such as software applications, may be available. By identifying preference relationships between software application preferences and media item preferences that indicate that a user with a specified software application preference is likely to also have a specified media item preference, a user's purchase history can be used to determine the user's likely media item preferences, and thus recommend a media item to the user.

To accomplish this, in some embodiments, application purchase data gathered from a population of users can be used to create applications preference clusters of users based on the application purchase data. For example, application purchase data gathered from each user of the population of users, such as data identifying software applications purchased by the user, can each be used as a data point or observation in a clustering algorithm, such as a k-means algorithm. Each resulting application preference cluster can represent a unique application preference profile based on the application purchase data of the members of the application preference cluster. An application preference profile can indicate the application preferences, i.e. the application likes and dislikes, of the members of the application preference cluster. In some embodiments, a user can be members of multiple application preference clusters.

In some embodiments, the application preference profile associated with an application preference cluster can be based on the applications, types of applications, etc., that are purchased by the members of the application preference cluster. For example, the likes of the members of the application preference cluster can be determined based on the applications, types of applications, etc., that are most commonly purchased by the members of the application preference cluster.

Further, media preference data collected from the population of users can be used to create a set of media preference clusters of the users. For example, media preference data of each user of the population of users, such as a song purchase history that identifies songs purchased by the user, can be a data point or observation in a clustering algorithm, such as a k-means algorithm. Each resulting media preference cluster of users can represent a unique media preference profile based on the media preference data of the members of the media preference cluster. A media preference profile can indicate the media item preferences, i.e. the media item likes and dislikes, of the members of the media preference cluster. In some embodiments, a user can be a member of multiple media preference clusters.

In some embodiments, the media preference profile represented by a media preference cluster can be based on the media items, types of media items, genre of media items, artists, authors, etc., that are purchased by the members of the media preference cluster. For example, the likes of the members of the media preference cluster can be determined based on the media items, genre of media items, artists, etc., that are most commonly purchased by the members of the media preference cluster.

The resulting application preference clusters and media preference clusters can be analyzed to identify preference relationships between the application preference clusters and media preference clusters. A preference relationship between an application preference cluster and a media preference cluster can indicate that a user that has the application preference profile represented by the application preference cluster is likely to also have the media preference profile represented by the media preference cluster. In other words, a user that has similar application preferences to the members of the application preference cluster is likely to also have similar media preferences to members of the media preference cluster. The identified preference relationships can be used to recommend media items to a user based on the user's application preferences as determined based on application purchase data gathered from the user.

To identify a preference relationship between an application preference cluster and a media preference cluster, the media preference cluster and the application preference cluster can be analyzed to determine the number of members of the application preference cluster that are also members of the media preference cluster. For example, in some embodiments, upon a determination that the members of the application preference cluster are over-represented or over-index in the media preference cluster, it can be determined that a preference relationship exists between the application preference cluster and the media preference cluster. Essentially, an assumption can be made that based on the fact that members of the application preference cluster are over-indexing in the media preference cluster, a user with the application preference profile represented by the application preference cluster is likely to also have the media preference profile represented by the media preference cluster.

Based on these identified preference relationships, a user's application purchase data can be used to identify the user's application preferences, which in turn can be used to identify the user's probable media item preferences. Thus, a user can be recommended songs based on their application purchase data.

FIG. 1 illustrates a general purpose computing environment 100 in which multiple computing devices can be configured to communicate with each other to recommend media items to a user. As illustrated, multiple computing devices can be connected to a communication network 110 and be configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network 110 can also be implemented using any number of communications links associated with one or more service providers, including one or more wired communication links, one or more wireless communication links, or any combination thereof. Additionally, the communication network 110 can be configured to support the transmission of data formatted using any number of protocols.

Multiple computing devices can be connected to the communication network. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the computing device illustrated in FIGS. 5A and 5B. To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated in FIG. 1, the exemplary system includes various computing devices in network communication with each other to recommend media items to a user. In particular, FIG. 1 shows recommendation server 105 configured to communicate with client device 115 via communication network 110.

To recommend a media item to a user, recommendation server 105 can include clustering module 120 configured to create application preference clusters from a population of users' application purchase data.

Each resulting application preference cluster can represent a unique application preference profile defined by the application purchase data gathered from the members of the application preference cluster. In some embodiments, the application preference profile represented by an application preference cluster can identify the application preferences, i.e. the application likes and/or dislikes, of the members of the application preference cluster based on the applications, types of applications, etc., that are most commonly purchased by the members of the application preference cluster.

Further, clustering module 120 can be configured to create media preference clusters from media preference data gathered from the same population of users. Media preference data can be any data that indicates a user's media preferences, i.e. likes and/or dislikes regarding media items. For example, in some embodiments, media preference data can include a user's song purchase history that identifies songs a user has purchased and thus is assumed to like.

Each resulting media preference cluster can represent a unique media preference profile defined by the media preference data gathered from the members of the media preference cluster. For example, the media preference profile represented by a media preference cluster can indicate the media preferences of the members of the media preference cluster based on the songs, genre of songs, artists, etc., most commonly purchased by the members of the media preference cluster.

To create the application preference clusters, clustering module 120 can be configured to use application purchase data gathered from a population of users. Application purchase data can include the software applications purchased by each user in the population of users. In some embodiments, recommendation server 105 can include application purchase database 125, which is configured to store application purchase data regarding the population of users.

Clustering module 120 can be configured to communicate with application purchase database 125 to retrieve the stored application purchase data.

Clustering module 120 can be configured to create the application preference clusters using any clustering method known in the art. For example, in some embodiments, the application preference clusters can be created using a k-means algorithm. Clustering module 120 can create the application preference clusters by using the application purchase data as input in the k-means algorithm. For example, the application purchase data gathered from each user can represent a unique data point or observation, and clustering module 120 can use a k-means algorithm to cluster the various observations. The resulting clusters can be the application preference clusters.

The media preference clusters can be created in a similar fashion to the application preference cluster. For example, recommendation server 105 can include media preference database 130 configured to store media preference data gathered from the same population of users used to create the application preference clusters. Media preference data can include any data that indicates a user's preferences for media items, i.e. the user's likes and dislikes for media items.

In some embodiments, media preference data can include a user's media purchase history such as the songs, books, movies, etc., purchased by the user. In some embodiments, media preference data can include feedback received from a user regarding media items. For example, media preference data can include a user's play or view count. Thus, it can be assumed that the more a user plays or views a media item, the more the user likes the media item. In some embodiments, media preference data can include ratings received from a user in regards to a media item. For example, in some embodiments, a user can give a media item a rating such as a 'thumbs up', 'like' or star rating.

In addition to media preference data that indicates that a user likes a media item, in some embodiments, media preference data can include data that indicates that a user does not like or dislikes a media item. For example, media preference data can include the number of times a user has skipped a media item scheduled to be played. Thus, it can be assumed that a user dislikes a media item if it is repeatedly skipped. Further, the media preference data can include feedback indicating that the user dislikes a media item, such as a poor rating. These are just a few examples of the types of media preference data that can be used and are not meant to be limiting. One skilled in the art would recognize that various types of media preference data are available and all possible embodiments are envisioned by the present disclosure.

Clustering module 120 can be configured to create the media preference clusters from the media preference data stored in media preference database 130. For example, in some embodiments, clustering module 120 can be configured to use the media preference data as input in a centroid based clustering algorithm such as a k-means algorithm. For example, the media preference data gathered from each user can represent a unique data point or observation, and clustering module 120 can use a k-means algorithm to cluster the various observations. The resulting clusters can be the media preference clusters.

Although a centroid based algorithm is used as an example, clustering module 120 can use any known clustering method to create the application preference clusters and the media preference clusters. For example, in some embodiments, clustering module 120 can be configured to use any of a hierarchical based clustering algorithm, connectivity based clustering algorithm, distribution based clustering algorithm, density based clustering algorithm, etc. Further, other centroid based clustering algorithms can be used. For example, clustering module 120 can use any of a fuzzy C-means clustering algorithm, spherical k-means algorithm, Minkowski metric weighted k-means algorithm, etc.

Each resulting application preference cluster can represent an application preference profile defined by the application purchase data gathered from the members of the application preference cluster. An application preference profile can indicate a set of application preferences, i.e. application likes and dislikes, based on the application preference data of the members of the application preference cluster. For example, the application preference profile can be based on the applications, type of applications, etc., that are most commonly purchased by the members of the application preference cluster.

Likewise, each media preference cluster can represent a media preference profile defined by the media preference data gathered from the members of the media preference cluster. For example, the media preference profile can identify a set of media preferences, i.e. the media item likes and dislikes, based on the media preference data of the members of the media preference profile. For example, the media preference profile can be based on the media items, types of media items, genre, artists, author, etc., that are most commonly liked, i.e. purchased, by the members of the media preference cluster. Thus, in an embodiment in which the media preference data is song purchase history, the media preference profile represented by a media preference cluster can be based on the songs most commonly purchased by the members of the media preference cluster.

Recommendation server 105 can include recommendation module 135 configured to recommend media items to a user based on the user's application purchase data and the application preference clusters and media preference clusters created by clustering module 120. In some embodiments, recommendation module 135 can be configured to receive a recommendation request requesting a media item recommendation for a specified user. For example, in some embodiments, recommendation module 135 can receive the recommendation request from a media station application that performs media items such as videos, songs, etc. The media item selected by recommendation module 135 in response to the recommendation request can be performed by the media station application.

Alternatively, in some embodiments, recommendation module 135 can receive a recommendation request from a shopping application such as an online website or program. The returned media item can be presented to the user as a recommendation for purchase.

In some embodiments, the recommendation request can include a user identifier that identifies the user that the content item recommendation will be targeted to. A user identifier can be any type of identifier that can be used to identify a user. In some embodiments, the user identifier can be used to locate the user's application purchase data. For example, the user's application purchase data can be stored in application purchase database 125, and associated with the user identifier associated with the user. In this type of embodiment, recommendation module 120 can use the identifier to locate the application purchase data of the user.

To recommend a media item to a user based on the user's application purchase data, recommendation module 135 can be configured to analyze the application preference clusters and the media preference clusters to identify preference relationships between the application preference clusters and media preference clusters. A preference relationship can indicate a relationship between an application preference cluster and a media preference cluster that suggests that users that have the application preference profile represented by the application preference cluster will also likely have the media preference profile represented by the media preference cluster. In other words, users that like the applications commonly purchased by the members of the application preference cluster will also like the media items commonly liked by the members of the media preference cluster.

In some embodiments, a preference relationship between an application preference cluster and a media preference cluster can be identified based on the number of members of the application preference cluster that are also a member of the media preference cluster. Alternatively, in some embodiments, a preference relationship between an application preference cluster and a media preference cluster can be identified based on the percentage of members of the application preference cluster that are also members of the media preference cluster. For example, recommendation module 135 can be configured to determine that a preference relationship exists between an application preference cluster and a media preference cluster when at least a predetermined percentage of the members of the application preference profile are also members of the media preference cluster. Thus, as an example, recommendation module 135 can determine that a preference relationship exists between an application preference cluster and a media preference cluster when at least 25% of the members of the application preference cluster are also members of the media preference cluster. Alternatively, recommendation module 135 can determine that a preference relationship exists between an application preference cluster and a media preference cluster when at least 25% of the members of the media preference cluster are also members of the application preference cluster.

In some embodiments, recommendation module 135 can determine that a preference relationship exists between an application preference cluster and a media preference cluster upon a determination that a predetermined number of members of the application preference cluster are also members of the media preference cluster. For example, recommendation module 135 can determine that a preference relationship exists between an application preference cluster and a media preference cluster upon a determination that at least 100 members of the application preference cluster are also members of the media preference cluster.

In some embodiments, the number of members of the application preference cluster that are also members of the media preference cluster can indicate a strength of the preference relationship between the application preference cluster and the media preference cluster. For example, the more members of the application preference cluster that are also members of the media preference cluster, the stronger the preference relationship between the application preference cluster and the media preference cluster. The strength of a preference relationship can indicate the likelihood that a user that has an application preference profile represented by the application preference cluster also has the media preference profile represented by the media preference cluster. For example, in some embodiments, the strength can be directly related to the percentage of members of the application preference cluster that are also members of the media preference cluster. Thus, if 75% of the members of the application preference cluster are also members of the media preference cluster it can be determined that there is a 75% chance that a user with the application preference profile represented by the application preference cluster, also has the media preference profile represented by the media preference cluster.

Recommendation module 135 can use the preference relationships to recommend a media item to a user based on the user's application purchase history. For example, in some embodiments, recommendation module 135 can identify the application preference profile of a user based on the user's application purchase data. Recommendation module 135 can use the identified preference relationships to identify a media preference profile that the user is likely to have based on the determined application preference profile of the user. Recommendation module 135 can then recommend a media item to the user based on the media preference profile. For example, in some embodiments, media preference profile 135 can recommend a media item that is commonly liked by the members of the media preference cluster that represents the media preference cluster.

Recommendation module 135 can be configured to identify the application preference profile of a user in numerous ways. In some embodiments, recommendation module 135 can determine the application preference profile of a user based on application purchase data gathered from the user. For example, recommendation module 135 can be configured to communicate with application purchase database 125 to gather the application purchase data of the user.

Recommendation module 135 can be configured to use the gathered application purchase data along with the application purchase clusters to identify the application purchase profile of the user. For example, recommendation module 135 can be configured to determine a distance from the data point or observation based on the user's application purchase data, to a centroid of each application purchase cluster. Recommendation module 135 can be configured to determine the application preference profile of the user based on the determined distances. For example, recommendation module 135 can determine that the user has the application purchase profile represented by the application purchased cluster with a centroid the shortest distance from the observation based on the user's application purchase data.

In some embodiments, recommendation module 135 can be configured to determine that the user has multiple application preference profiles. For example, recommendation module 135 can determine that the user has each application preference profile represented by an application preference cluster that has a centroid within a specified distance of the observation based on the user's application purchase data.

In some embodiments, the distance between the observation based on the user's application purchase data and a centroid of an application purchase cluster can be used to determine how similar the user's application preference profile is to the application preference profile represented by the application preference cluster. For example, the shorter the distance between the observation based on the user's application purchase data and a centroid of an application preference profile, the more similar the user's application preference profile is to the application preference profile represented by the application preference cluster.

Recommendation module 135 can select a media item to recommend to a user based on the user's determined application preference profile and the preference relationship identified for the application purchase cluster that represents the user's application preference profile. For example, upon determining the application preference profile of a user, recommendation module 135 can use the preference relationships associated with the application preference cluster that represents the user's application preference profile to identify a media preference profile that the user likely has. Recommendation module 135 can thus select a media item based on the media preference data gathered from the members of the media preference cluster that represents the identified media preference profile.

Figure 2:
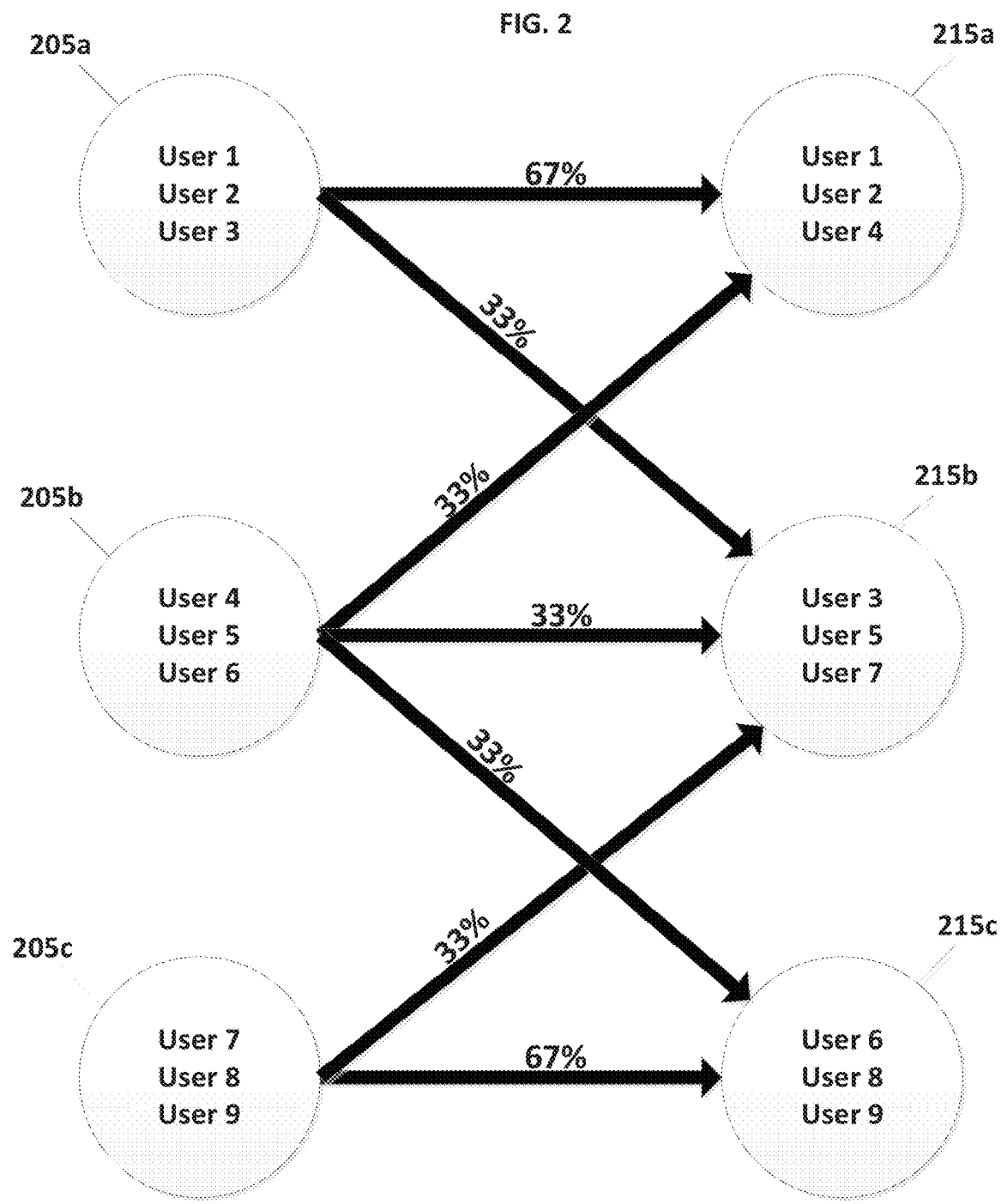
FIG. 2 illustrates identifying preference relationships between application preference clusters and media preference clusters.

FIG. 2 illustrates identifying preference relationships between application preference clusters and media preference clusters. As shown, a population of nine users is clustered into three application preference clusters 205a, 205b, 205c and three media preference clusters 210a, 210b, 210c. A preference relationship between an application preference cluster and a media preference cluster can be identified based on the number of members of the media preference cluster that are also members of the application preference cluster.

Thus, to identify a preference relationship between application preference cluster 205a and the media preference clusters 210a, 210b, 210c, the members of each of the media preference clusters 210a, 210b, 210c, can be analyzed to determine the number of members of application preference cluster 205a that are members of the respective media preference cluster. For example, media preference cluster 210a includes two members, user 1 and user 2, that are also members of application preference cluster 205a. Media preference cluster 210b includes one member, user 3, that is a member of application preference cluster 205a. Finally, media preference cluster 210c does not include any members that are members of application preference cluster 205a.

A preference relationship can therefore be identified between application preference cluster 205a and media preference cluster 210a because media preference cluster 210a includes the highest number of members of application preference cluster 205a. Alternatively, a determination can be made that a preference relationship does not exist between application preference cluster 205a and media preference cluster 210c because media preference cluster 210c includes the least number of members of application preference cluster 205a. In some embodiments, a preference relationship can also be identified between application preference cluster 205a and media preference cluster 210b because media preference cluster 210b includes members of application preference cluster 205a.

In some embodiments, a preference relationship between an application preference cluster and a media preference cluster can be assigned a preference relationship strength based on the determined number of users of the application preference cluster that are members of the media preference cluster. For example, the preference relationship between application preference cluster 205a and media preference cluster 210a can be determined to be stronger than the preference relationship between application preference cluster 205a and media preference cluster 210b because media preference cluster 210a includes a greater number of members of media preference cluster 205a than media preference cluster 210b does.

The preference relationship strength between an application preference cluster and a media preference cluster can indicate the likelihood that a user with the application preference profile represented by the application preference cluster, also has the media preference profile represented by the media preference cluster. Thus, it can be determined that a user with the application preference profile represented by application preference cluster 205a is more likely to have the media preference profile represented by media preference cluster 210a than with the media preference profile represented by media preference cluster 210b.

In some embodiments, the preference relationship strength between an application preference cluster and a media preference cluster can indicate a percentage of likeliness that a user having the application preference profile represented by the application preference cluster has the media preference profile represented by the media preference cluster. For example, the percentage can be based on the percentage of members of the application preference cluster that are also members of the media preference cluster. Thus, the preference relationship strength between application preference cluster 205a and media preference cluster 210a can indicate that a user with the application preference profile represented by application preference cluster 205a has a 67% chance of having the media preference profile represented by media preference cluster 210a, whereas a user with the application preference profile represented by application preference cluster 205a has only a 33% chance of having the media preference profile represented by media preference cluster 210b.

Using the above described methods, it can be determined that application preference cluster 205b has a preference relationship with each of media preference clusters 210a, 210b and 210c. Further, it can be determined that a user with the application preference profile represented by application preference cluster 205b has a 33% chance of having the media preference profile represented by media preference profile 210a, a 33% chance of having the media preference profile represented by media preference profile 210b, and a 33% chance of having the media preference profile represented by media preference profile 210c.

Further, it can be determined that application preference cluster 205c has a preference relationship with media preference cluster 210b and media preference cluster 210c. Further, the preference relationship strength for the preference relationship between application preference cluster 205c and media preference cluster 210c indicates that there is a 67% chance that a user with the application preference profile represented by application preference 205c has the media preference profile represented by media preference cluster 210c. Further, the preference relationship strength for the preference relationship between application preference cluster 205b and media preference cluster 210b indicates that there is a 33% chance that a user with the application preference profile represented by application preference 205c has the media preference profile represented by media preference cluster 210b.

Figure 3:
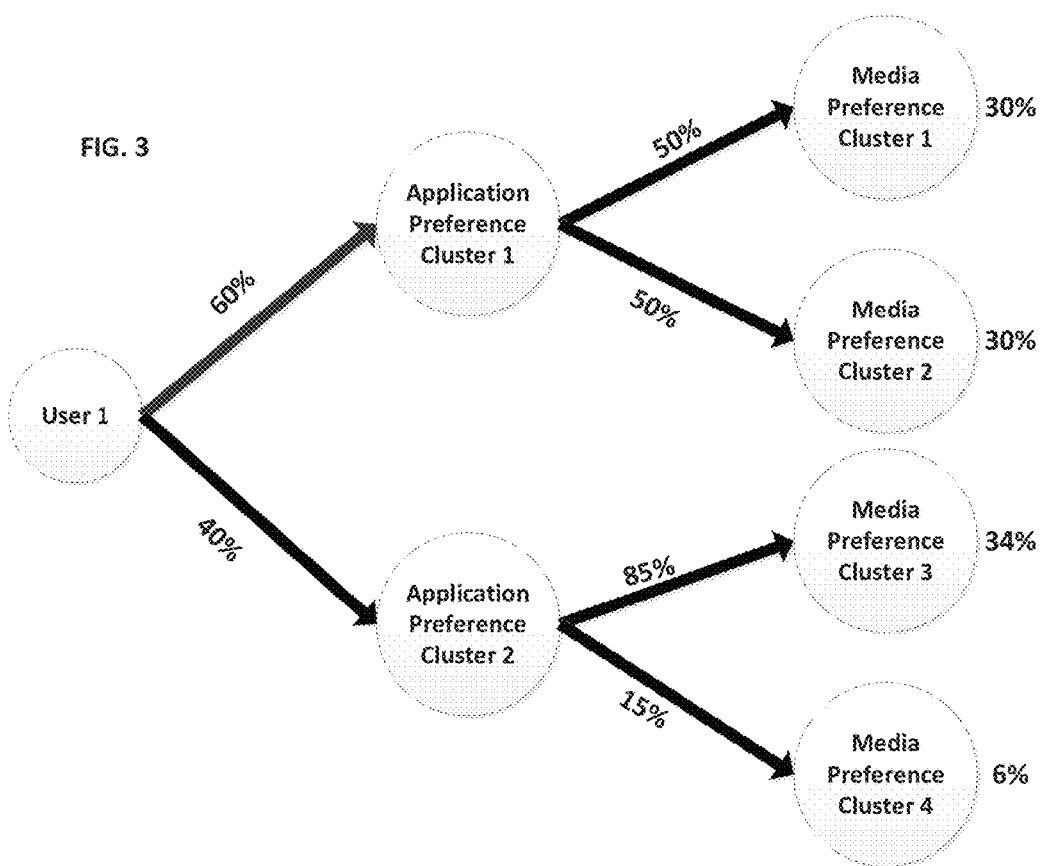
FIG. 3 illustrates recommending a media item to a user based on the user's determined application preference profile.

FIG. 3 illustrates recommending a media item to a user based on the user's determined application preference profile. As illustrated, user 1's application preference profile is similar to both the application preference profile represented by application preference cluster 1 and application preference cluster 2. In some embodiments, the user's application preference profile can be determined based on the user's application purchase data. For example, a data point or observation can be based on the user's application preference data and the application preference profile of the user can be determined based on a distance of the observation to the centroid of application preference clusters.

As illustrated, the user's application preference profile is 60% like the application preference profile represented by application preference cluster 1 and 40% like the application preference profile represented by application preference cluster 2. In some embodiments, the percentage of similarity between a user's application preference profile and an application preference profile represented by an application preference cluster can be based on the distance between the observation based on the user's application purchase data and the centroid of the application preference cluster. The closer the distance, the more similar the user's application preference profile is to the application preference profile defined by the application preference cluster.

The percentages can be used to select a media item for user 1. For example, upon receiving a recommendation request for the user, a media item can be selected for the user based on the application preference profile represented by application preference cluster 1, 60% of the time. Likewise, a media item can be selected for the user based on the application preference profile represented by application preference cluster 2, 40% of the time.

The preference relationships associated with application preference cluster 1 and application preference cluster 2 can be used to identify a media preference profile that user 1 is likely to have. As shown, application preference cluster 1 has a preference relationship with media preference cluster 1 and media preference cluster 2. Further, application preference cluster 2 has a preference relationship with media preference cluster 3 and media preference cluster 4. Thus, a media item can be selected for user 1 based on the media preference profile represented by application preference clusters 1, 2, 3, and 4. For example, a media item that is commonly purchased by members of the application preference cluster can be selected as a recommendation for user 1.

Further, each preference relationship is associated with a preference relationship strength. A preference relationship strength indicates the likelihood that a user with an application preference profile represented by an application preference cluster will also have the media preference profile associated with a media preference profile.

As shown, the preference relationship between application preference cluster 1 and media preference cluster 1 has a strength of 50%. This can indicate that there is a 50% chance that a user that has similar application preferences as the members of application preference cluster 1 also has similar media item preferences as the members of media preference cluster 1.

The application preference strengths can be used to dictate selection of a media item for a user. For example, a user with the application preference cluster represented by application preference cluster 1 can be recommended media items based on media preference cluster 1, 50% of the time and based on media preference cluster 2, 50% of the time. Likewise, a user with the application preference cluster represented by application preference cluster 2 can be recommended media items based on media preference cluster 3, 85% of the time and based on media preference cluster 4, 15% of the time.

Media items can be recommended to user 1 based on the user 1's determined application preference profile and the preference relationships associated with the application preference clusters. For example, upon receiving a recommendation request form user 1, 60% of the time a media item can be recommended to user 1 based on the application preference profile represented by application preference cluster 1. Further, when a media item is recommended to user 1 based on the application preference profile represented by application preference cluster 1, 50% of the time, a media item can be selected based on media preference cluster 1, and 50% of the time a media item can be selected based on media preference cluster 2. Thus a media item will be recommended to user 1 based on media preference cluster 1, 30% of the time (60%×50%=30%), and a media item will be recommended to user 1 based on media preference cluster 2, 30% of time (60%×50%=30%).

Likewise, 40% of the time, user 1 will be recommended a media item based on the application preference profile represented by application preference cluster 2. Further, when a media item is recommended to user 1 based on the application preference profile represented by application preference cluster 1, 85% of the time, a media item can be selected based on media preference cluster 3, and 15% of the time a media item can be selected based on media preference cluster 4. Thus a media item will be recommended to user 1 based on media preference cluster 3, 34% of the time (40%×85%=34%), and a media item will be recommended to user 1 based on media preference cluster 4, 6% of time (40%×15%=6%).

Figure 4:
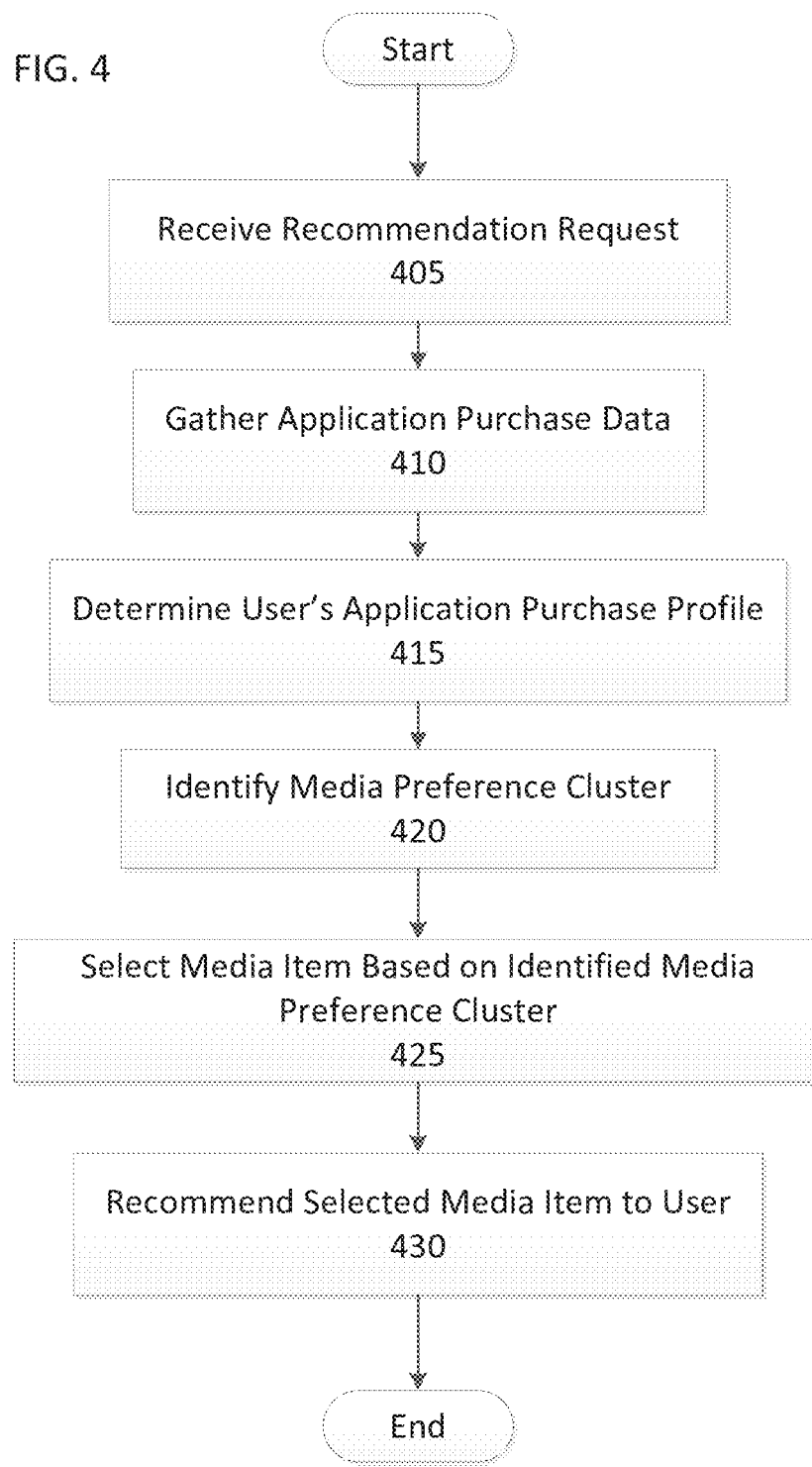
FIG. 4 illustrates an exemplary method embodiment of recommending a media item to a user.

FIG. 4 illustrates an exemplary method embodiment of recommending a media item to a user. As shown, the method begins at block 405 where a recommendation request is received. A recommendation request can be a request requesting that a media item be recommended to a specified user. For example, in some embodiments, the recommendation request can be received from a media station application and the recommended media item can be performed for the user. In some embodiments, the recommendation request can be from an online store website or application and the recommended media item can be presented to the user as a recommendation to purchase.

Further, in some embodiments, the recommendation request can identify a user that the media item recommendation is targeted to. For example, the recommendation request can include a user identifier that identifies the user.

Upon receiving the recommendation request, the method continues to block 410 where application purchase data of the user is gathered. Application purchase data can be data identifying applications purchased by the user. In some embodiments, the user identifier received with the recommendation request can be used to locate the user's application purchase data. For example, the application purchase data can be stored in a database and associated with the user's user identifier.

At block 415 an application preference profile of the user can be determined. An application preference profile can indicate the user's application likes and dislikes. In some embodiments, the user's application preference profile can be determine in respect to predetermined application preference profiles. For example, application purchase data gathered from a population of users can be clustered into application preference clusters that each represent a unique application preference profile. The user's application preference profile can be determined based on the application preference profiles represented by the application preference clusters. For example, a user's application preference profile can be represented as being 40% similar to a first application preference profile represented by an application preference profile and 60% similar to a second application preference profile represented by an application preference profile.

To determine the user's application preference profile, in some embodiments, the gathered application purchase data of the user can be used as a data point or observation and the distance from the data point to centroids of the various application preference clusters can be determined. The application preference profile of the user can be determined based on the various distances. For example, the shorter the distance between the observation and the centroid of an application preference cluster, the more similar the user's preference profile is to the preference profile represented by the application preference cluster. Likewise, the longer the distance between the observation and the centroid of an application preference cluster, the less similar the user's preference profile is to the preference profile represented by the application preference cluster.

Upon determination of the application preference profile of the user, the method continues to block 420 where a media preference cluster is identified based on the user's application preference profile. Media preference cluster can be clusters created from media preference data gathered the same population of users used to create the application preference clusters. Each media preference cluster can represent a unique media preference profile based on the media preference data gathered from the members of the media preference cluster.

Preference relationships between the application preference clusters and the media preference clusters can be used to identify a media preference cluster based on a user's application preference cluster. A preference relationship between an application preference cluster and a media preference cluster can indicate that a user with the application preference profile represented by an application preference cluster also has the media preference profile represented by the media preference cluster.

In some embodiments, the preference relationship between an application preference cluster and a media preference cluster can be based on the number of members of the application preference cluster that are also members of the media preference cluster. For example, the greater the number of members of the application preference cluster that are also members of the media preference cluster, the stronger the preference relationship between the application preference cluster and the media preference cluster. Likewise, the lower the number of members of the application preference cluster that are also members of the media preference cluster, the weaker the preference relationship between the application preference cluster and the media preference cluster.

Upon identifying a media preference cluster for a user based on the user's application preference profile and the preference relationships, the method continues to block 425 where a media item is selected for the user based on the media preference cluster. For example, the media item can be selected based on the media preference data gathered from the members of the media preference cluster. In some embodiments, the media item selected can be a media item that is commonly liked by members of the media preference cluster as determined from the media preference data of the members of the media preference cluster.

After a media item is selected, at block 430 the media item is returned in response to the recommendation request. For example, the media item can be transmitted to a client device from which the recommendation request was received. In some embodiments, the returned media item can be performed for the user as part of a media station. Alternatively, in some embodiments, the returned media item can be recommended to the user for purchase.

Although the example of recommending media items based on a user's application purchase data is used in the present disclosure, this is just one example and is not meant to be limiting. One skilled in the art would readily recognize that any type of data can be substituted for application purchase data and media preference data, and this disclosure considers any and all such embodiments. Thus, the discloses system can be used to recommend any target-category item to a user based on available source category preference data of the user.

In some embodiments, two different types of media preference data can be used to recommend a media item to a user. For example, media preference data specific to books can be used to recommend video games to a user. To accomplish this, book preference data and video game preference data gathered from a population of users can be used to create a set of book preference clusters and video game preference clusters. Preference relationships can be identified between the clusters and a user's book preference data can be used to recommend a video game to the user. Other examples include recommending books based on application preference data, recommending applications based on media preference data, recommending movies based on television preference data, etc. Any two classes of data can be used to create clusters and determine preference relationships which can be used to make recommendations to a user.

Figure 5A:
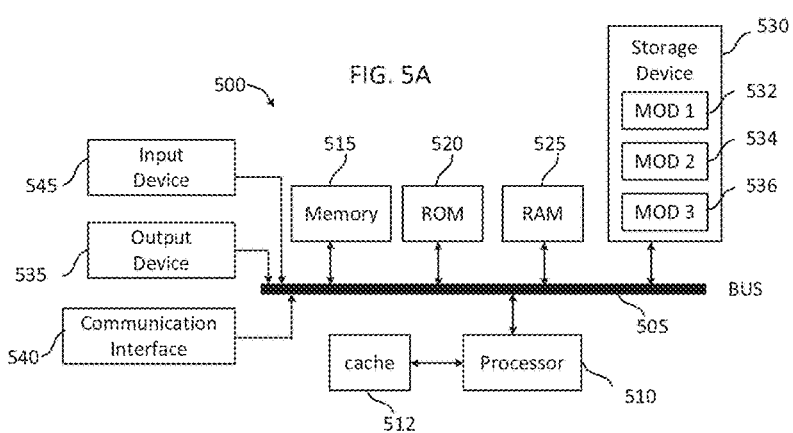
FIGS. 5A and 5B illustrate exemplary possible system embodiments.
Figure 5B:
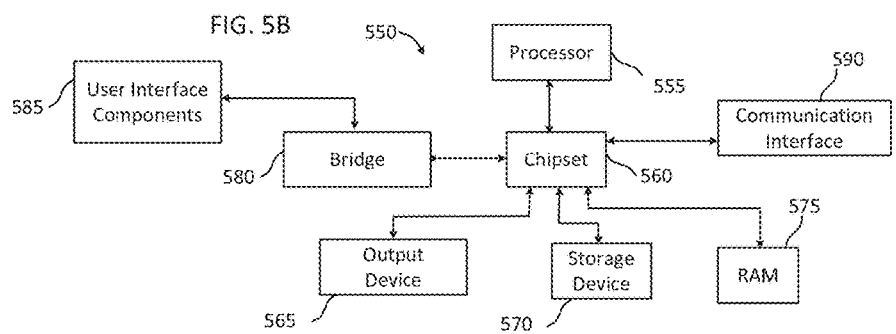

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, at a server computer and via a network, a recommendation request requesting an electronic media item be served to a first electronic account;
   determining, by the server computer, that music preference data associated with the first electronic account is unable to recommend an electronic music item;
   obtaining, by the server computer, a plurality of application preference clusters that are each associated with an electronic application preference profile, wherein the application preference clusters are created by a first clustering operation that clusters a first population of electronic accounts into the application preference clusters based on software applications purchased online by each of the first population of electronic accounts;
   selecting from the application preference clusters and by the server computer, a first application preference cluster associated with a first electronic application preference profile for the first electronic account, wherein the first electronic application preference profile corresponds to the first electronic account at an application preference strength level determined from similarities between the first electronic application preference profile and applications purchased by the first electronic account;
   obtaining, by the server computer, a plurality of music preference clusters that are each associated with an electronic music preference profile, wherein the music preference clusters are created by a second clustering operation that clusters a second population of electronic accounts into music preference clusters based on online music preference data for the second population of electronic accounts;
   identifying, by the server computer, a preference relationship between the first application preference cluster and a first music preference cluster, wherein the preference relationship is associated with a preference relationship strength value that indicates a likelihood that an account within the first application preference cluster is also part of the first music preference cluster;
   identifying, by the server computer, a first electronic music preference profile for the first music preference cluster to be used for recommending electronic media items for the first electronic account based on the application preference strength level and the preference relationship strength value; and
   selecting, by the server computer, at least one electronic music item to be served to the first electronic account based on the identified first electronic music preference profile.

2. The method of claim 1, wherein the identifying of the preference relationship between the first application preference cluster and the first music preference cluster includes:
   determining that the first population of electronic accounts represented in a first application preference cluster over-index in the first music preference cluster.

3. The method of claim 1, wherein selecting at least one electronic music item comprises:
   identifying at least one electronic music item commonly purchased by the second population of electronic accounts represented in the first music preference cluster.

4. The method of claim 1, wherein selecting the first application preference cluster associated with the first electronic application preference profile for the first electronic account comprises:
   calculating a mathematical representation of the first electronic account based on application purchase data from which the software applications purchased by the first electronic account are identifiable; and
   determining that the first electronic account has the first electronic application preference profile when the first application preference cluster is associated with a smallest distance measurement from the mathematical representation of the first electronic account.

5. The method of claim 2, wherein determining that the first population of accounts represented in the first application preference cluster over-index in the first music preference cluster comprises:
   determining that the preference relationship strength value is greater than a predetermined number, wherein the preference relationship strength value is based on a number of electronic accounts within the first application preference cluster and the first music preference cluster.

6. The method of claim 2, wherein determining that the first population of electronic accounts represented in the first application preference cluster over-index in the first music preference cluster comprises:
   determining that that the preference relationship strength value is greater than a second preference relationship strength value for the first music preference cluster and a second application preference cluster.

7. The method of claim 1, wherein the preference relationship strength value is based on a portion of the second population of electronic accounts represented by the first music preference cluster that are also a portion of the first population of electronic accounts represented by the first application preference cluster.

8. The method of claim 1, wherein the first clustering operation includes performing a centroid based clustering algorithm.

9. A server computer comprising:
   at least one processor; and
   at least one memory containing instructions that, when executed, cause the at least one processor to:
     receive, via a network, a recommendation request requesting an electronic target-category item be served to a first electronic account;
     determine that electronic target-category preference data associated with the first electronic account is not capable of recommending an electronic music item;
     determine a plurality of source-category preference clusters that are each associated with an electronic source-category preference profile, wherein the source-category preference clusters are created by a first clustering operation that clusters a first population of electronic accounts into the source-category preference clusters based on online source-category preferences of each of the first population of electronic accounts;
     select from the source-category preference clusters a first source-category preference cluster associated with a first electronic source-category preference profile for the first electronic account, wherein the first electronic source-category preference profile corresponds to the first electronic account at a source-category strength level determined from similarities between the first electronic source-category preference profile and source-categories purchased by the first electronic account;
     determine a plurality of target-category preference clusters that are each associated with an electronic target-category preference profile, wherein the target-category preference clusters are created by a second clustering operation that clusters a second population of electronic accounts into target-category preference clusters based on online target-category preference data for the second population of electronic accounts;
     identify a preference relationship between the first source-category preference cluster and a first target-category preference cluster, wherein the preference relationship is associated with a preference relationship strength value that indicates a likelihood that an account within the first source-category preference cluster is also part of the first target-category preference cluster;
     identify a first electronic target-category preference profile for the first target-category preference cluster to be used for recommending target-category items for the first electronic account;
     select at least one target-category item based on the identified first electronic target-category preference profile; and
     recommend, based on the recommendation request, the selected at least one target-category item.

10. The server computer of claim 9, wherein the instructions to identify the preference relationship between the first source-category preference cluster and the first target-category preference cluster further cause the at least one processor to:
    determine that the first population of electronic accounts represented in the first source-category preference cluster over-index in the first target-category preference cluster.

11. The server computer of claim 9, wherein the instructions to select at least one target-category item comprises instructions to:
    identify at least one target-category item commonly purchased by the second population of electronic accounts represented in the first target-category preference cluster.

12. The server computer of claim 9, wherein the instructions to select the first source-category preference cluster associated with the first electronic source-category preference profile for the first electronic account further comprises instructions to:
    calculate a mathematical representation of the first electronic account based on source-category preference data identifying source-category preferences of the first electronic account; and
    determine that the first electronic account has the first electronic source-category preference profile when the first source-category preference cluster is associated with a smallest distance measurement from the mathematical representation of the first electronic account.

13. The server computer of claim 10, wherein the instructions to determine that the first population of accounts represented in the first source-category preference cluster over-index in the first target-category preference cluster comprises instructions to:
    determine that the preference relationship strength value is greater than a predetermined number, wherein the preference relationship strength value is based on a number of electronic accounts within the first source-category preference cluster and the first source-category preference cluster.

14. The server computer of claim 10, wherein the instructions to determine that the population of electronic accounts represented in the first source-category preference cluster over-index in the first target-category preference cluster comprises instructions to:
    determine that the preference relationship strength value is greater than a second preference relationship strength value for the first target-category preference cluster and a second source-category preference cluster.

15. At least one non-transitory computer-readable medium comprising instructions that, when executed by a computing device, cause the computing device to:
    receive, via a network, a recommendation request requesting an electronic media item be served to a first electronic account;

determine that music preference data associated with the first electronic account is unable to recommend an electronic music item;

create, based on a first clustering operation, a plurality of application preference clusters that are each associated with an electronic application preference profile, wherein the first clustering operation clusters a first population of electronic accounts into the application preference clusters based on software applications purchased online by each of the first population of electronic accounts;

select, from the application preference clusters, a first application preference cluster associated with a first electronic application preference profile for the first electronic account, wherein the first electronic application preference profile corresponds to the first electronic account at an application preference strength level determined from similarities between the first electronic application preference profile and applications purchased by the first electronic account;

create, based on a second clustering operation, a plurality of music preference clusters that are each associated with an electronic music preference profile, wherein the second clustering operation clusters a second population of electronic accounts into music preference clusters based on online music preference data for the second population of electronic accounts;

identify a preference relationship between the first application preference cluster and a first music preference cluster, wherein the preference relationship is associated with a preference relationship strength value that indicates a likelihood that an electronic account within the first application preference cluster is also part of the first music preference cluster;

identify a first electronic music preference profile for the first music preference cluster to be used for recommending electronic media items for the first electronic account based on the application preference strength level and the preference relationship strength value; and select at least one electronic music item based on the identified first electronic music preference profile.

16. The non-transitory computer-readable medium of claim 15, wherein the instructions further cause the computing device to:

determine that the first population of electronic accounts represented in a first application preference cluster over-index in the first music preference cluster.

17. The non-transitory computer-readable medium of claim 15, wherein the instructions to select the at least one electronic music item comprises instructions to:

identify at least one electronic music item commonly purchased by the second population of electronic accounts represented in the first music preference cluster.

18. The non-transitory computer-readable medium of claim 16, wherein the instructions to select the first electronic application preference further comprises instructions to:

calculate a mathematical representation of the first electronic account based on application purchase data from which the software applications purchased by the first electronic account are identifiable; and determine that the first electronic account has the first electronic application preference profile when the first application preference cluster is associated with a smallest distance measurement from the mathematical representation of the first electronic account.

19. The non-transitory computer-readable medium of claim 16, wherein the preference relationship strength value is based on a portion of the second population of electronic accounts represented by the first music preference cluster that are also a portion of the first population of electronic accounts represented by the first application preference cluster.

20. The non-transitory computer-readable medium of claim 16, wherein the first clustering operation includes performing a centroid based clustering algorithm.

21. The method of claim 1, wherein the second cluster operation is configured to utilize the online music preference data as input into a centroid based clustering algorithm.

22. The method of claim 21, wherein the centroid based clustering algorithm is a k-means function algorithm.

23. The method of claim 1, wherein the first clustering operation and the second clustering operation each include a hierarchical based clustering algorithm.

* * * * *